Sept. 14, 1943. R. C. BENNER ET AL Re. 22,373

MANUFACTURE OF ABRASIVE ARTICLES

Original Filed Sept. 1, 1937

Inventors,
RAYMOND C. BENNER
ROMIE L. MELTON
by W. Foley
Attorney

Reissued Sept. 14, 1943 Re. 22,373

UNITED STATES PATENT OFFICE 22,373

MANUFACTURE OF ABRASIVE ARTICLES

Raymond C. Benner and Romie L. Melton, Niagara Falls, N. Y., assignors to The Carborudum Company, Niagara Falls, N. Y., a corporation of Delaware Original No. 2,193,265, dated March 12, 1940, Serial No. 161,996, filed September 1, 1937. Application for reissue March 10, 1942, Serial No. 434,132

11 Claims. (Cl. 51—309)

This invention relates generally to metal bonded abrasive articles.

It relates particularly to abrasive articles wherein the abrasive particles are uniformly distributed throughout a metallic bond and the method of making same.

Heretofore in the art, metal bonded abrasive articles, such as wheels, have been made by mixing the abrasive granules with molten metal and allowing the mass to harden. This method has proven unsatisfactory because the high temperature of the molten metal impairs the abrasive characteristics of the granules, and it is impossible to produce an article wherein the abrasive granules are uniformly distributed throughout the metal bond because the difference in specific gravity between the abrasive granules and the metal allows the granules to float to the top of the mix before the metal has solidified.

In an effort to overcome the above mentioned difficulties, precoating of the granules with metal by electrolytic means before adding them to the molten metal has been tried. This method has proven only partially successful. The coating of metal does, to some extent, protect the abrasive granules during the coating operation, but the coated grains float to the top of the mix and a non-uniform article results.

Another serious defect in abrasive articles made by the above described methods lies in their lack of brittleness. It has been considered to be necessary that grinding wheels have the abrasive particles bonded together by a bond with brittle characteristics so that, as the wheel is worn down to a smaller diameter through use, the bond will break away and expose fresh abrasive. Otherwise, the wheel will soon become glazed and smooth because of the outer layer of abrasive particles being worn away and the inner layers becomining covered by the bond.

The invention herein claimed and described overcomes the difficulties mentioned. By means of the methods now about to be described, it is possible to easily and economically produce metal bonded articles which have the abrasive uniformly distributed throughout the mass, the bonds of which have the desired brittle characteristics and the abrasive granules of which are unaffected by the heat applied during manufacture.

Figure 1:
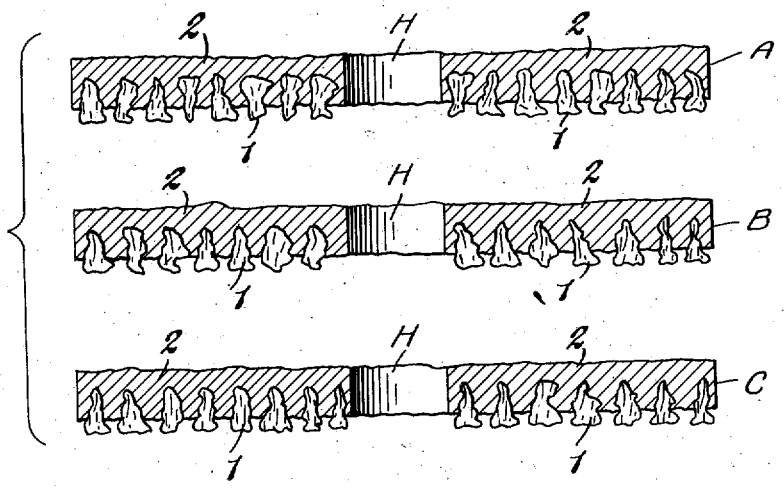
Figure 2:
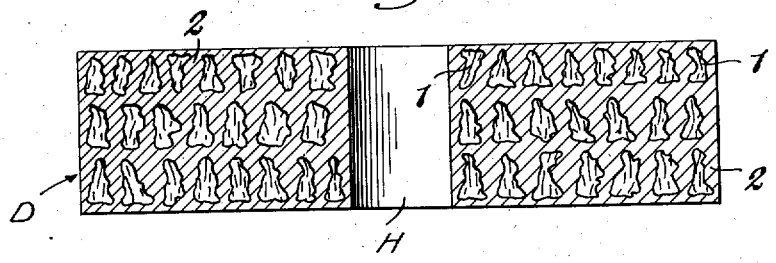

In the accompanying drawing, Figure 1 is a diagrammatic view of a group of abrasive containing metal sheets to be compacted into an abrasive wheel, the sheets being shown in section, and Figure 2 is a diagrammatic sectional view of an abrasive wheel formed by compacting with heat and pressure, the sheets shown in Figure 1.

In our improved method, the abrasive grains are first given a uniform coating of metal. This may be done by any suitable means, such as electroplating, spraying, etc.

The metal coated grains are then compacted in a mold under pressure and are sintered at a temperature just below the melting point of the particular bond chosen. If desired, a temporary binder of glue or its equivalent may be added to the mix before pressing. This is desirable if the compacted mass is to be removed from the mold before sintering. The temporary binder should be sufficiently volatile so that it will be driven off during the heat treating operation.

If desired, a small quantity of powdered metal may be added to the mass before it is compacted. If this is done, a somewhat stronger and much more dense wheel is the result. The powdered metal is mixed uniformly with the coated granules and may be the same type of metal with which the granules are coated, or it may be a metal which will alloy with the coating on the granules.

The pressure applied to the aggregate will depend upon the desired porosity of the wheel. This, of course, will vary for wheels of different diameters, and thicknesses, and will depend also somewhat upon the particular abrasive and/or bond used.

The time of sintering also will vary with the diameter and thickness of the wheel and with the kind of metal used.

These two factors must be determined experimentally to suit each specific set of conditions. In general, the pressure is chosen that will give the desired porosity and the sintering is carried on until the metal coated particles are firmly united into a homogeneous aggregate.

The wheels produced by this method have the uniform grinding and self-dressing characteristics which have long been sought for in the art.

As a variation of the above described method, instead of sintering the mass to unite the particles, the particles may be welded into a compact mass. This may be accomplished by the process of electrical resistance welding known as "shot welding."

In carrying out this operation, the sides of the mold are lined with paper or other suitable insulating material and electrical connections are made to the bottom of the mold and to the plunger.

After the mass of metal coated abrasive particles has been compacted by the application of pressure to the mold plunger, a current of high amperage is passed through the mass. This current is continued for a very short time, only long enough to cause the outer part of the metal coating on the granules to melt slightly but not long enough to allow the metal to flow.

The article may then be immediately removed from the mold and is ready for use.

Wheels made by welding possess the "self-dressing" characteristics in a remarkable degree. This method is also faster than any other known method and is therefore economical because it does not require that large numbers of molds and sintering ovens be tied up for long periods.

Metal bonded abrasive wheels may also be made by the following method:

Abrasive granules are adhesively attached to a suitable support or backing, such as paper or cloth, by means of a volatile adhesive. After the adhesive has hardened, the coated side of the paper is given a relatively thick coating of metal by spraying. The paper or cloth backing is then peeled off leaving a thin metal sheet with abrasive granules imbedded therein.

A number of these sheets, depending upon the wheel thickness desired, are assembled, one on top of another, and placed in a press. Pressure is applied to compact the sheets. The wheel may then be sintered or welded, as described above, into a homogeneous article. The adhesive, being volatile, will be driven off during the heating.

Figure 1 of the drawing shows diagrammatically a plurality of sheets A, B and C formed as described above, abrasive grain 1 being embedded in spray metal 2. Figure 2 shows diagrammatically an abrasive wheel D having an arbor hole H formed by compacting sheets A, B and C with heat and pressure.

In practicing the above disclosed methods, any of the abrasives in common use may be used, such as silicon carbide, aluminum oxide, emery or diamond. The metal selected for bond depends upon the abrasive used as well as upon the grinding characteristics desired. Pure metal such as zinc, tin or copper may be used. If a very brittle bond is required, alloys may be employed but due to the fact that our method produces a wheel bonded with pure metal that has an exceptionally good brittleness characteristic, the use of alloys will not be necessary in most cases.

The methods herein described are especially suitable for the manufacture of metallic bonded diamond wheels.

The diamond particles are at first treated with a flux to dissolve any surface impurities, then they are given a coating of metal, preferably zinc, by spraying. Either of the above described methods may then be employed for forming the aggregate.

Having thus described our invention, we claim:

1. The method of manufacturing a metal bonded abrasive article comprising the steps of spraying an unsized abrasive coated web with metal, peeling off the backing web, assembling successive layers of the metal bonded abrasive granules into the desired shape, then applying heat and pressure to compact the mass.

2. The method of manufacturing metal bonded diamond abrasive wheels comprising the steps of adhering the diamond particles to a backing web, spraying the coated web with metal, peeling off the backing web, assembling successive layers of the metal bonded diamond particles into the desired shape, then applying heat and pressure to compact the mass.

3. The method of manufacturing abrasive articles comprising the steps of coating individual abrasive particles with metal, compacting the coated abrasive particles to a desired shape and porosity, and uniting said coated particles at their points of contact by passing a high amperage electric current through the shaped mass for an interval of time so short that melting of the metal coatings takes place substantially only at said points of contact.

4. The method of manufacturing abrasive articles comprising the steps of coating individual abrasive particles with metal, compacting the coated abrasive particles to a desired shape and porosity, and fusing together the metal coatings substantially only at their points of contact by the heat produced by the resistance of the shaped mass to the passage, during a very short interval of time, of a high amperage electric current and in the absence of substantial heating from other sources.

5. The method of manufacturing abrasive articles, comprising the steps of spraying a surface coating of metal onto individual abrasive particles, compacting the coated abrasive particles to a desired shape and porosity, and uniting said coated particles at their points of contact by passing a high amperage electric current through the shaped mass for an interval of time so short that melting of the metal coatings takes place substantially only at said points of contact.

6. The method of manufacturing abrasive articles, comprising the steps of coating individual abrasive particles with a metal bond of desired brittleness characteristics, compacting the coated abrasive particles to a desired shape and porosity, and uniting said coated particles at their points of contact by passing a high amperage electric current through the shaped mass for an interval of time so short that melting of the metal coatings occurs substantially only at the points of contact, whereby the brittle character of the metal coatings remains for the most part unchanged.

7. The method of manufacturing metal bonded diamond abrasive wheels, comprising the steps of coating individual diamond particles with metal, compacting the coated diamond particles to a desired shape and porosity, and uniting said diamond particles at their points of contact by passing a high amperage electric current through the shaped mass for a duration of time so short that fusion of the metal coatings takes place substantially only at said points of contact.

8. The method of manufacturing a metal bonded abrasive article which comprises spraying metal against a layer of abrasive grain so as to form a thin metal sheet having abrasive granules imbedded therein, assembling a plurality of such sheets to form an article of the desired shape and thickness, and then applying heat and pressure to compact the mass.

9. The method of manufacturing metal bonded diamond abrasive wheels which comprises forming thin metal sheets with diamond abrasive particles imbedded at least partially therein, assembling a plurality of such sheets to form a wheel of the desired shape and thickness, compacting said assembled sheets, and sintering them together into a homogeneous body.

10. An abrasive wheel formed by assembling a plurality of thin metal sheets having abrasive granules imbedded at least partially therein into a wheel of the desired shape and thickness, compacting said assembled sheets, and sintering them together into a homogeneous body.

11. A sintered abrasive wheel comprising a plurality of thin metal sheets, having abrasive granules imbedded at least partially therein, compacted and sintered together into a homogeneous article.

RAYMOND C. BENNER.
ROMIE L. MELTON.